Dec. 30, 1941.    C. G. OLSON    2,268,515
SCREW DRIVER
Filed July 15, 1939
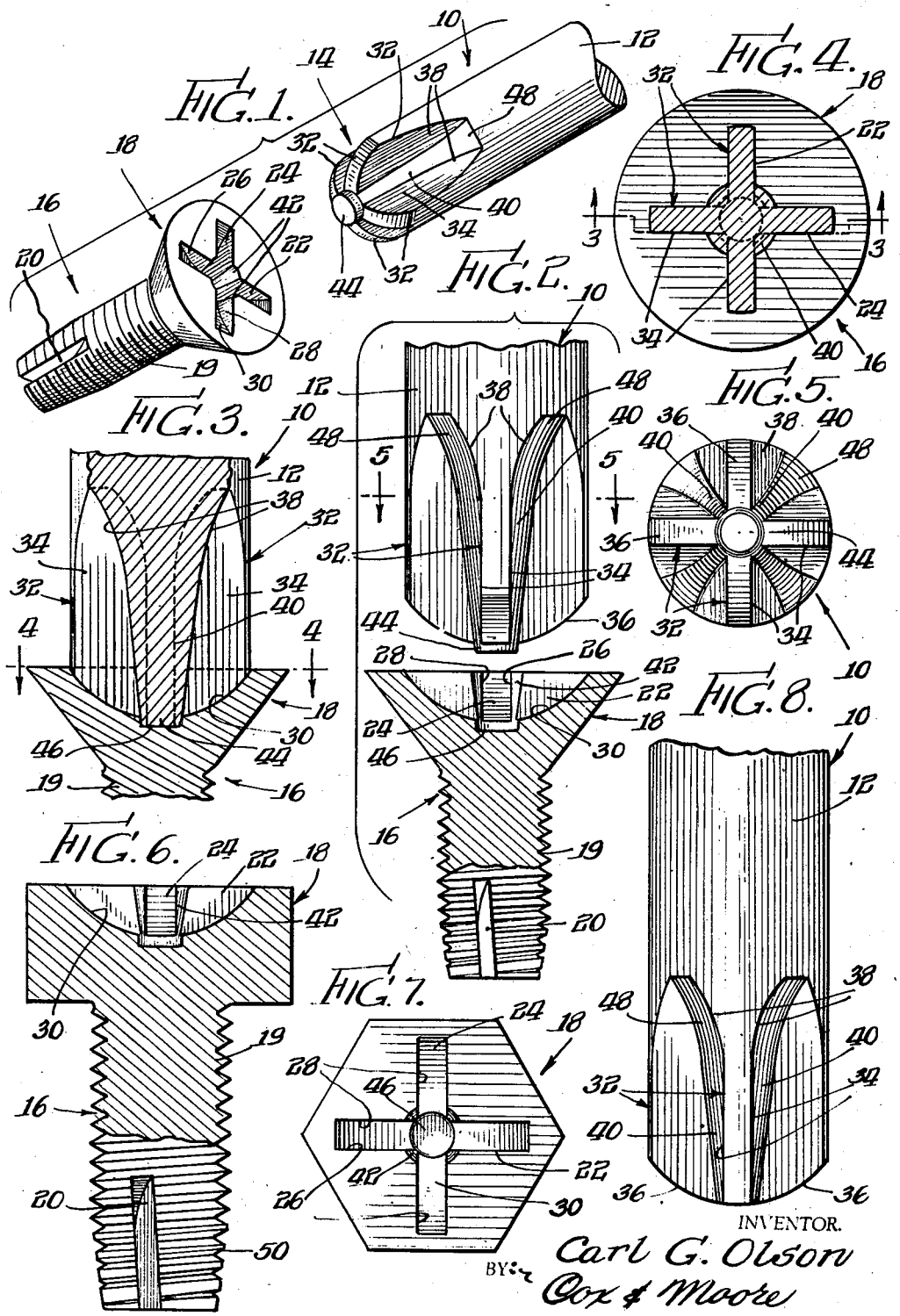
INVENTOR.
Carl G. Olson
BY Cox & Moore
ATTORNEYS.

Patented Dec. 30, 1941

2,268,515

UNITED STATES PATENT OFFICE 2,268,515

SCREW DRIVER

Carl G. Olson, Chicago, Ill., assignor to Illinois Tool Works, Chicago, Ill., a corporation of Illinois Application July 15, 1939, Serial No. 284,729

1 Claim. (Cl. 145—50)

The present invention relates to a driving or turning tool, and particularly to a screw driver for forcing fasteners, and particularly fasteners of the threaded, or thread-forming types into operative association with an aperture in a workpiece.

The present invention contemplates yet more particularly the provision of a fastener turning element as above adapted to cooperate with a screw or fastener having a head portion provided with a cruciform slot configuration wherein two or more slots intersect at an angle to receive complementary angularly disposed blades on the tool. Constructions of this character have certain important practical advantages over conventional screw heads equipped with the usual single transverse slot. One of the most important advantages results from the fact that in constructions where the screw driver co-acts with the usual conventional single slot, there is no structure to counteract the tendency for the screw to cant with respect to the tool, and accordingly the blade may slip out of the screw slot, damaging the edges thereof, and creating or forming a cam surface which thereafter prevents the screw driver blade from engaging effectually therein. In other words, while the conventional screw driver blade operating in a complementary single slot only supports the screw against canting in one direction, the cruciform slot and tool construction overcomes this difficulty by resisting canting of any angularly disposed planes and positively prevents a complementary multi-bladed screw driver from becoming dislodged from the recess.

The present invention particularly contemplates the provision of a screw driver or multi-bladed turning tool as above, having arcuate convex blade portions adapted to co-act with relatively shallow recesses on the fastener. Blade receiving recesses which are relatively deep and which extend to the periphery of the fastener head appreciably weaken the screw head structure, thus limiting the driving torque which may be transmitted to the fastener. While this disadvantage may be overcome by the provision of screw heads having shallow recesses, preferably terminating substantially short of the head margin, nevertheless severe difficulty has been encountered in retaining inter-engagement of the screw driver prior to or during initial insertion within a workpiece. That is to say, in rapid production, it is of great practical significance to provide a turning tool which engages readily with a fastener and tends to frictionally cooperate therewith, so that the screws are temporarily secured or retained upon the tool in proper co-axial relationship. The use of shallow cruciform recesses as above has, in the past, been considered commercially impractical, due to this difficulty of maintaining engagement of the turning tool, particularly during, and just prior to, initiation of the driving operation.

It is accordingly an important object of the present invention to provide a turning or driving tool adapted to co-act relatively with a shallow cruciform recess of the foregoing character to retain the co-axial engagement of the parts in driving alignment with an impositive gripping force.

It is yet more specifically an object of the present invention to provide a screw driver structure, such as the foregoing, of multi-bladed construction wherein the corners or recesses provided adjacent the junction of the blades present gradually or regularly tapered sections conically disposed to frictionally cooperate with complementary surfaces on the fastener head for promoting frictional retention of the parts.

The present invention particularly contemplates the provision of an improved screw driver as above, capable of transmitting relatively substantial driving forces, such as are desirable in the application of thread-forming fasteners, which stresses are applied to the head portion of the fastener in predetermined axial relationship and without distorting or marring the head portion of the fastener, and while retaining the tool in driving position against lateral or angular dislodgment.

Other objects and advantages will be more apparent from the foregoing detailed description when considered in connection with the accompanying drawing wherein:

Figure 1 is a perspective view of a fastener and the extremity of a driving tool embodying the principle of the present invention, the parts being shown in spaced relationship just prior to application to a workpiece;

Figure 2 is an elevational detailed view of the extremity of the tool shown in Figure 1 arranged just above and in inserting relationship to the head portion of a complementary thread-forming fastener;

Figure 3 is a sectional detailed view taken on line 3—3 of Figure 4, and showing the extremity of the screw driver engaged in operative relationship with the complementary recess in the head of the fastener;

Figure 4 is a detailed sectional view taken in plan upon the line 4—4 of Figure 3;

Figure 5 is an end view taken axially beyond the extremity of the tool shown in Figures 1 to 5;

Figure 6 is an elevational view of a hexagonal headed fastener constructed for cooperation with the screw driver embodying the features of the present invention, the head portion being shown in section;

Figure 7 is a plan view of the fastener shown in Figure 6; and

Figure 8 is an elevational view of the entering extremity of the modified form of tool.

As shown in Figures 1 to 4, the present invention contemplates the provision of a tool, indicated by the reference numeral 10, and having a shank portion 12 terminating in an entering or driving end configuration, adapted to co-act with a fastener 16 having a head 18 providing complementary tool receiving recesses, as will hereinafter appear more in detail.

It is important to note that the tool 10 has not been shown in its entirety for the reason that the shank 12 will, in most applications of the present invention, comprise merely a driving bar or rod fitted with any suitable drive means, such, for example, as a handle construction, or a motive actuating means as the case may be. The shank affords convenient access to the point of application of the fastener, and accordingly may possess any convenient shape or form, as will be understood to those skilled in the art.

In order to render the purpose and construction of the instant driving tool more readily apparent, the structure of the complementary fastener 16 will first be outlined. It should be noted that the present fastener 16 is of the thread-forming type adapted to cut or form its own threads in an unthreaded workpiece. To this end, a threaded shank 19 is provided with a slot 20 defining thread cutting edges or sections on either side thereof. It is to be noted that the present invention is of particular significance in the application and assembly of fasteners of the instant type wherein considerable force may be necessary to rapidly and expeditiously assemble the fasteners in a relatively hard and tough work material, such as steel or plastic molded compositions.

The flat tapered head portions 18 of the fastener formed to engage a countersunk aperture are provided with a pair of intersecting grooves or recesses 22 and 24 which terminate preferably at a substantial distance from the periphery of the flat upper surface of the screw head. It is important to note that the recesses 22 and 24 are relatively shallow, the deepest point in each groove being spaced a substantial distance above the lower extremity of the head 18 (see Figures 2 and 3). Each of these grooves is defined by flat parallel side walls 26 and 28 and concave circular or arcuate bottom surfaces 30.

For inter-engaging this recess arrangement in driving relationship, the shank 12 of the driving element 10 is formed at its lower end, or extremity, with a plurality of blades or wings 32 extending at right angles, or, in other words, angularly disposed in the same angular relationship as recesses 22 and 24 for engagement therewith. Each blade has parallel flat longitudinal side walls or surfaces 34 which extend from arcuate end surfaces 36. As will be apparent from consideration of the foregoing figures, the arcuate surfaces 36 are complemental to the arcuate bottom surfaces 30 of the recesses 22 and 24 and the blades are accordingly adapted to be received within the recesses, as clearly shown in Figure 3. Flat parallel side walls 34 of the blades 32 at their other axial extremity terminate in diverging side walls 38 which cause the blade portions to merge into the cylindrical body of the shank 12.

It is extremely important to note, in accordance with the present invention, that the blades 32 do not intersect to form angular corners, but, on the contrary, project outwardly from a central gradually tapered or conical portion 40. In other words, the vicinity of the corners formed by the intersection of adjacent flat side surfaces of the blades is formed to present concentrically disposed convex surfaces forming sections of a cone. The conical axis is in the present embodiment coincidental with the axes of the blades 32. It is of great importance to note that this conical surface has a regular and gradually inward taper providing arcuate pilot sections adapted to cooperate with complementary arcuate sections 42 on the fastener. The tapered or conical pilot sections 42, which connect the adjacent portions of the intersecting grooves in the fastener head, may be provided by drilling, boring, or otherwise forming the corners of the recesses at a taper complementary to the taper of the portion 40.

The driving element or tool 10 is provided with an extension of the tapered body portion 40 which forms a pin or projection 44 extending downwardly from the end surface to initially facilitate the insertion of the driving element into the screw head, and in the embodiment shown in Figures 2 and 3, the centrally drilled portion of the fastener head is extended axially inwardly beyond the curved surfaces 30 as at 46 for accommodating this pin portion 44. At the opposite axial extremities, the curved tapered surfaces 40 merge into rapidly diverging portions 48, making integral engagement with the shank 12.

It will be apparent from the foregoing that the present fastener tool or screw driver seats within the complementary recess conformation on the head of a fastener with the four blades 32 accommodated within the recesses 22 and 24 and operable, therefore, to transmit a turning torque to the screw head without the creation of forces tending to disengage the parts. In other words, the flat parallel side surfaces 34 of the blades, as well as the flat side walls 26 and 28 of the recess engaged thereby, extend axially of the tool and fastener, and accordingly resolve the turning forces completely in a rotational direction. Lateral disengagement of the parts is prevented by virtue of the cruciform arrangement of the recesses and the blades. It is of greatest importance to note, however, that the tapering of frusto-conical sections 40 of the tool are of particular significance and of outstanding advantage in mass production work, in that they facilitate the retention of the fastener upon the driving extremity of the screw driver during, or before, actual insertion of the tool into the workpiece. To this end, the inclination or taper of the converging portions 40 must be maintained within definite limits to enable the desired frictional cooperation, since it will be obvious that an excessive degree of taper will defeat the purpose of the present structure. More particularly it has been discovered, in connection with the present invention, that the included angle of the converging portions or surfaces 40 must not exceed 15 degrees to enable the foregoing frictional cooperation of the complementary conical surface portions.

I have disclosed in Figures 6 and 7 a modified form of fastener with which the present form of tool is adapted to be employed. This modification indicates the wide variety of fastener types with which the present turning tool is adapted to be advantageously employed. The fastener shown in Figures 6 and 7 more particularly comprises a shank 16 slotted adjacent the entering end as at 20, but having screw thread sections decreasing in height adjacent the entering end as at 50. The head 18 of the present fastener is of hexagonal form having a substantially constant vertical thickness.

I have shown in Figure 8 a modified form of screw driver differing from the preferred construction described in the foregoing specification in omitting the projecting pin or projecton 44. In this tool, the conical or tapered sections 40 terminate at the lower edges of the blades 32, or, in other words, are confined within the boundaries formed by the curved edges or surfaces 36 providing the entering extremity of the tool. It will be understood that this form of tool may be employed in cooperation with fastener heads devoid of the additional recess or depression 46.

The present invention provides an improved screw driver construction, cooperable with fasteners having relatively shallow cruciform slots and enables the practical employment of superior slot constructions of this type by virtue of the facility with which the present tool retains the fastener just after initial application of the parts.

It will be obvious from the foregoing that this invention is of particular significance in rapid assembly operations by means of thread-forming fasteners wherein the improved shallow recess construction is important in transmitting the desired high rotational stresses, but wherein facility of initial application of the parts is very important. Thus, it is evident that the present invention obviates the wasteful loss of time which would otherwise result from tendency of the parts to disengage and to fall apart, it having been discovered that, in accordance with the present invention, the fasteners which have been positioned upon the driving tool are engaged by an impositive grip which expedites and facilitates assembly operations.

In accordance with the present invention, it will be appreciated that by a relatively shallow arcuate bottom surface is meant an arc corresponding to a relatively shallow arcuate recess in a screw head such as represented in the present drawing and, accordingly, wherein the axial depth of the arc is not substantially greater than one-fourth the width of the blade, or, in other words, the diameter of the shank or thereabout. It is further pointed out that the present invention provides a substantial conical gripping surface between the blades at the entering end of the tool. In other words, a substantial retention surface is provided in a position where it is available in connection with the application of shallow slotted fasteners and to this end, the circumferential length of the arcuate surface available is substantially half the circumferential dimension of the cone in the same transverse plane, as see Fig. 5.

The present application is a continuation in part of my co-pending application, Serial No. 137,015, filed April 15, 1937 now Patent No. 2,182,568. The foregoing application describes and claims a screw construction, while the present application contains specification and claims covering the complementary driving bit for driving association with the screw head.

Obviously, the invention is not limited to the specific structural arrangement disclosed herein, but is capable of other modifications and changes without departing from the spirit and scope of the present invention.

Having thus described my invention, what I claim as new and desire to secure by Letters Patent is:

A driving tool for driving a screw head having a relatively shallow arcuate cruciform recess configuration adapted to receive the driving tool, said tool having a cylindrical shank provided at one extremity thereof with blades arranged in intersecting planes, each of said blades being defined by opposite parallel side wall surfaces and a convex arcuate bottom surface, the arc of said bottom surface being relatively shallow and complementary to the relatively shallow recess in the screw head and the axial depth of said arc being not greater than one-fourth the diameter of the shank, said tool shank intermediate the corners formed by the intersecting blades being provided with convex surfaces forming sections of a cone whose axis is the axis of the shank, said sections tapering toward the lower extremity of said tool, the included apex angle of said cone being not in excess of 15° to promote retention of a fastener upon said tool when the fastener is arranged thereon prior to final application to the workpiece and said convex surfaces in a transverse plane at the screw entering end of the tool having a combined arcuate length substantially half the circumference of said cone in said plane, whereby the convex surfaces present substantial gripping areas between the blades at the entering end of the tool.

CARL G. OLSON.